United States Patent [19]

Brochu et al.

[11] Patent Number: 5,380,605
[45] Date of Patent: Jan. 10, 1995

[54] PROCESS FOR PREPARING SOLUTIONS OF ELECTROLYTES FOR SOLID POLYMER BATTERIES BY TRANSFER FROM THE POLYMER SYNTHESIS SOLVENT

[75] Inventors: Fernand Brochu, Longueuil; Michel Duval, Jean-Brillant, both of Canada

[73] Assignee: Hydro-Quebec, Montreal, Canada

[21] Appl. No.: 214,304

[22] Filed: Mar. 17, 1994

[51] Int. Cl.$^6$ ............................................. H01M 6/16
[52] U.S. Cl. ..................................... 429/188; 429/194
[58] Field of Search ............... 429/188, 194, 197, 201, 429/198, 196; 252/62.2

[56] References Cited

U.S. PATENT DOCUMENTS 3,205,183  9/1965  Vandenberg et al. .
4,303,748  12/1981  Armand et al. .
4,357,401  11/1982  Andre et al. .
4,578,326  3/1986  Armand et al. .

FOREIGN PATENT DOCUMENTS 1269702  5/1990  Canada .

Primary Examiner—Anthony Skapars
Attorney, Agent, or Firm—Oblon, Spivak, McClelland, Maier, & Neustadt

[57] ABSTRACT

A solvent of the polymer-salt complex and a non-solvent thereof are added to the solvent used in the polymer synthesis, to provide a lower and an upper phase. The lower phase contains substantially all the polymer in the solvent of the polymer-salt complex. It is separated from the upper phase and the salt is added to the lower phase to constitute a solution of the electrolyte.

16 Claims, 2 Drawing Sheets

PROCESS FOR PREPARING SOLUTIONS OF ELECTROLYTES FOR SOLID POLYMER BATTERIES BY TRANSFER FROM THE POLYMER SYNTHESIS SOLVENT

BACKGROUND OF INVENTION

1. Field of the Invention

The present invention concerns a process for preparing solutions containing the electrolytes used in lithium-polymer batteries of the ACEP type (polymer electrolyte battery). More specifically, the invention is concerned with a process for transferring the polymer directly from the solvent of the polymer synthesis, to the more polar solvent of the polymer-salt complex. Generally, the invention aims at the formation of a ternary solvent mixture including the solvent of the polymer synthesis, the solvent of the polymer-salt complex and a non-solvent of the polymer, and at the achievement of two phases where the polymer is found in the lower phase containing most of the solvent of the polymer-salt complex.

2. Description of Prior Art

Lithium-polymer electrolyte ACEP batteries are manufactured by superposing three main types of films: a film of a positive electrode containing an electrochemically active material, for example vanadium oxide, a film of an electrolyte consisting of a polymer and a lithium salt, and a film of metallic lithium. Each of these films is between 15 and 50 $\mu$m thick, for a total thickness of the elementary film of battery of 100 to 150 $\mu$m. About 30 meters of this elementary film 15 cm wide, are typically required to give a battery of 100 Wh.

The families of polymers used in the electrolyte films are described in Armand's U.S. Pat. No. 4,303,748, as well as in more detail in U.S. Pat. Nos. 4,578,326 and 4,357,401, and Canadian Patent No. 1,269,702. For example, they may consist of amorphous copolymers and terpolymers, which may be cross-linkable. These polymers are not presently commercially available, and are mainly synthesized with coordination catalysts of the type described in Vandenberg U.S. Pat. No. 3,205,183 (September 1965). This polymerization may only be carried out in relatively non polar solvents such as ethyl ether or toluene.

The polymer-lithium salt mixtures used in the electrolytes and positive electrodes are usually not soluble in these solvents, and more polar ones such as those based on acetonitrile, must be used to solvent-cast the films, a commonly used method for the electrolytes, and the only one for positive electrodes.

To switch from the synthesis solution containing only the polymer to the electrolyte solution containing the polymer-lithium salt mixture, the solvents must therefore be changed. One way to proceed consists in precipitating the polymer from the synthesis solution by means of a non-solvent, in drying the precipitate then in re-dissolving the latter in the new solvent, with the lithium salt. The last two steps are long and costly, particularly with polymers of high molecular weights (Mw > 100,000).

SUMMARY OF INVENTION

It is an object of the invention to provide for the transfer of the polymer, directly from its synthesis solvent to the solvent of the polymer-salt complex of the electrolyte, without having to precipitate the polymer and to re-dissolve the polymer in the latter solvent.

Another object aims at providing a process for the preparation of solutions of electrolyte for lithium-polymer batteries of the ACEP type, enabling to obtain the polymer directly in a mixture of solvents leading to a more efficient drying of the films of electrolyte and positive electrode during the coating process (azeotropic mixture).

Another object of the invention is achieved by adding a solvent of the polymer-salt complex and a non-solvent to the solvent of the polymer synthesis, preferably acetonitrile and heptane when toluene is used as the synthesis solvent.

The invention concerns a process for the preparation of a solution of an electrolyte containing a polymer-salt complex as well as a solvent of said complex, said salt being represented by formula $M^+X^-$ where $M^+$ is a cation which is derived from an alkali metal or the ammonium ion and $X^-$ represents an anion of a strong acid. The polymer is derived from at least one monomer comprising at least one heteroatom capable of forming bonds of the donor-receptor type with the cation $M^+$, from a synthesis solution consisting of a synthesis solvent and the polymer. The polymer is thereafter transferred into a solvent of the complex to which said salt is added. The process is characterized in that a solvent of the complex and a non solvent of the polymer are added to the synthesis solution under conditions leading to the formation of an upper phase containing most of the non solvent and a lower phase containing most of the solvent of the complex and most of the polymer, with both phases containing varying amounts of the synthesis solvent, the lower phase is then separated from the upper phase and the salt is added to said lower phase, or the salt is added to the solvent mixture, then the phases are separated.

The invention therefore consists in transferring the polymer directly from its synthesis solvent to the solvent of the polymer-salt complex of the electrolyte, without having to precipitate and re-dissolve the polymer. For this purpose, a solvent of the polymer-salt complex and a non-solvent of the polymer are added to the synthesis solution. Two liquid phases appear: an upper phase which mainly consists of the non-solvent and possibly the synthesis solvent, and a lower phase which mainly consists of the solvent of the polymer-salt complex, and which contains nearly all the polymer because of its greater affinity for the latter solvent. After decantation, the lower phase is collected, and the salt, preferably a lithium salt, is added thereto. The salt may also be added with the solvent of the polymer-salt complex during the preceding step. In this manner, it is possible to carry out the "transfer" of the polymer from one solvent to the other.

The relative amounts of the three different solvents are selected to give the desired final concentration of polymer and composition of solvents in the lower phase, which are governed by the transfer exchanges between the two phases.

The polymers concerned by the invention are all those, including those described above, which may be used as electrolytes in the field of ACEP batteries. The synthesis solvents are usually aromatic hydrocarbons, (benzene, toluene, etc.), aliphatic and cycloaliphatic hydrocarbons (hexane, cyclohexane, etc.), and ethers. Toluene is particularly suitable. The typical concentrations of polymer in these solvents vary with the yield and the conditions of the polymerization reaction and the monomers used. They may vary from 0.01 to 0.5 g of polymer per ml of solution, the more currently used values being from about 0.11 to 0.13 g/ml.

In the case where the synthesis solvents consist of aromatic hydrocarbons and ethers, and particularly in the case of toluene, the preferred non-solvents for the transfer process are $C_5$ to $C_{15}$ aliphatic and cycloaliphatic liquid hydrocarbons (above $C_{15}$, they are too viscous), preferably those containing 7 carbon atoms and particularly heptane.

In the case where the synthesis solvents are aliphatic and cycloaliphatic hydrocarbons, it is not necessary to add non-solvent for the transfer.

The solvents of the polymer-salt complexes of the electrolyte are preferably polar aprotic solvents of the acetonitrile, propylene carbonate, dimethylformamide and tetramethylene sulphone types. Binary mixture of these solvents comprising less than 35 percent by weight of aromatic solvents such as toluene are also suitable, as well as the ternary mixtures containing less than 30 percent by weight of aromatic hydrocarbons such as toluene and less than 5 percent of aliphatic hydrocarbons such as heptane. The acetonitrile/toluene/heptane binary and ternary mixtures are particularly suitable in that they constitute azeotropes which are easier to evaporate from the solutions used for coating the films of electrolytes and positive electrodes. Non-aprotic polar solvents such as alcohols (ethanol, methanol) are also good solvents of the polymer-salt complexes, however, they are not electrochemically compatible with the materials of the positive and negative electrodes of ACEP batteries.

The concentrations of polymer in the solvents of the polymer-salt complexes used to prepare the solutions of electrolyte and positive electrode vary typically from 0.01 to 0.5 g of polymer per ml of solution, in order to get acceptable viscosities for coating the solutions. These values depend mainly on the molecular weight of polymer, with typical values ranging from 0.07 g/ml when Mw=300,000 to 0.25 g/ml when Mw=80,000.

BRIEF DESCRIPTION OF DRAWINGS

The invention will now be illustrated by means of the annexed drawings given by way of illustration but without limitation and in which.

The triangle coordinates are the following: composition of the solvent mixture before phase separation and transfer:

$$\% \text{ Acetonitrile} = \frac{Va}{Va + Vt + Vh}$$

$$\% \text{ Toluene} = \frac{Vt}{Va + Vt + Vh}$$

$$\% \text{ Heptane} = \frac{Vh}{Va + Vt + Vh}$$

with:
Va=volume of acetonitrile added
Vh=volume of heptane added
Vt=volume of toluene in the synthesis solution used
Vs=volume of synthesis solution used
Cs=polymer concentration in the synthesis solution, in g per ml of solution $$Vt = Vs \frac{(1 + C_s)}{d}$$

d=density of the dried polymer.

DESCRIPTION OF PREFERRED EMBODIMENTS

The relative amounts of polymer-salt complex solvent and of non-solvent to be added to the polymer synthesis solvent will vary depending on the polymer concentration and solvent composition desired in the lower phase. To simplify the presentation, acetonitrile, heptane and toluene will be used below to represent the three groups of solvents described above, respectively. These examples of solvents should be considered as illustrative and not limiting.

Figure 1:
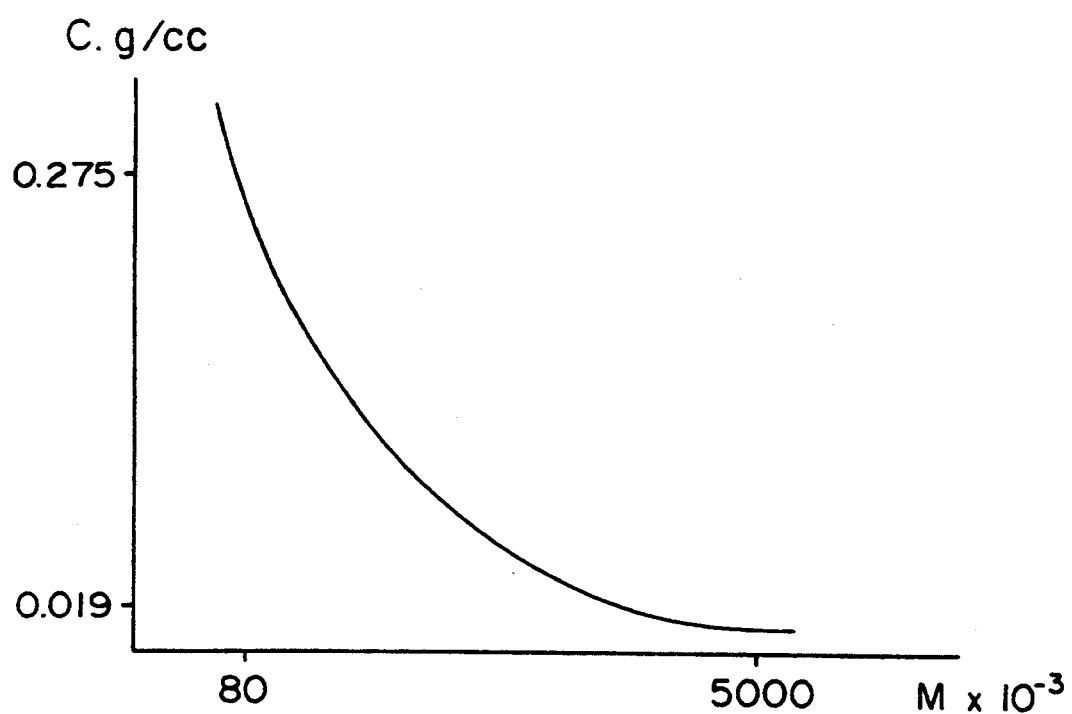
FIG. 1 is a curve illustrating typical polymer concentrations to be used as a function of polymer molecular weight, in order to get polymer solutions with acceptable viscosities with coating methods such as doctor-blade or reverse-roll.
Figure 2:
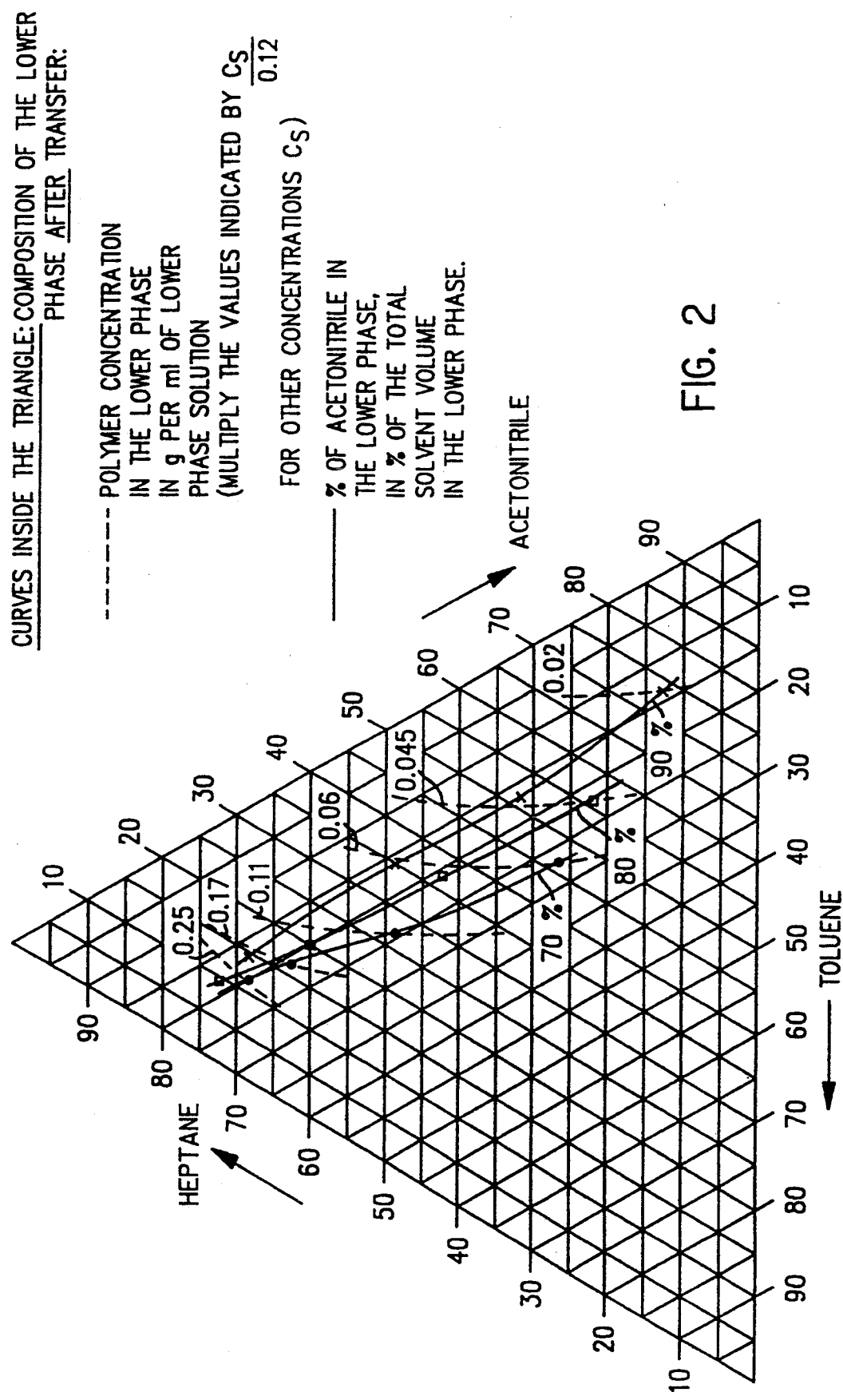
FIG. 2 is a triangular diagram indicating the quantities of acetonitrile and heptane which must be added to those of toluene already present in the synthesis solution (these three quantities being expressed in % with respect to one another), in order to get the desired polymer concentration and acetonitrile content in the lower phase, starting from a given concentration $C_O$ of polymer in the synthesis solution.

The amounts of acetonitrile and heptane to be added to the solution of polymer in toluene should be such that after addition, the lower phase, where the polymer is found in a mixture of solvents containing mostly acetonitrile, has the following properties:

1) a viscosity, therefore a polymer concentration, before and after the addition of the lithium salt, which is acceptable for coating the solutions into films. This concentration is governed mostly by the molecular weight of the polymer, and can be deduced from curves such as shown in FIG. 1. The quantities of acetonitrile and heptane to be added will then be dictated by the amount of polymer present or its concentration in the toluene synthesis solution.

2) A solvent composition (acetonitrile/toluene/heptane), before and after the addition of the lithium salt, providing a good solubilization of the polymer-salt complex and a rapid drying of the solutions which are used for coating films. Less than 65% acetonitrile does not normally enable to dissolve the polymer-salt complex, and more than 90% sharply reduces the rate of drying. The distribution of the solvents between the lower (mainly acetonitrile) phase and the upper (mainly heptane) phase depends on the solubility of each solvent in the two others, and on the initial volumes of each of them.

The quantities of acetonitrile and heptane to be added have been determined experimentally from toluene/acetonitrile/heptane ternary mixtures, with and without the presence of polymer. The volumes of the phases have been measured and their solvent composition analyzed by gas chromatography. It has been observed that the presence of polymer has little or no effect on the distribution of the solvent between the two phases.

Table I gives typical values of the quantities of acetonitrile and heptane to be added to obtain various polymer concentrations and acetonitrile contents in the lower phase, starting from 111 ml of a solution of polymer in toluene at a concentration of 0.12 g of polymer per ml of solution and containing therefore 100 ml of toluene (with a density of the polymer of 1.21). If, for example, the concentration to be obtained in the lower phase is 0.128 g/ml, as deduced from FIG. 1 in the case of a molecular weight of 235,000, and the acetonitrile content requested is 80%, Table I indicates that 300 ml heptane and 100 ml acetonitrile should be added. For different starting volumes of solution, simply adjust columns 2 to 6 of Table 1. For different starting concentrations of polymer in toluene $C_5$, replace 0.2 by $C_5$ in column 1, adjust column 2 using the density of the polymer, and multiply column 7 by $C_S/0.12$.

Table I and the triangle may be incorporated in a computer program to facilitate the calculations.

The examples which follow illustrate the invention without limiting same.

EXAMPLE 1

In 30 liters of a synthesis solution of polymer in toluene, at a concentration of 0.12 g of polymer per ml of solution, and with a molecular weight Mw=235,000, 120 liters of heptane are poured slowly. The polymer precipitate is decanted, filtered and dried during several days at room temperature in order to remove heptane absorbed on the polymer, by means of a flow of dry nitrogen, intended to prevent the absorption of humidity and the risks of oxidation of the polymer.

EXAMPLE 2

0.5 kg of the polymer precipitate of example 1 is slowly poured into 3.5 liters of acetonitrile and the mixture is stirred over rollers. A large block of swelled polymer is obtained which takes about ten days to be dispersed in the solution, which is still barely uniform. When 0.11 kg of lithium salt TFSI (lithium trifluorosulphonimide) is added simultaneously to the polymer, the solution takes about nine days to be dispersed under the same conditions of stirring and is barely uniform. A film of electrolyte which is coated in a dry atmosphere with this latter solution remains still sticky at the surface after 30 minutes of drying at 60° C.

EXAMPLE 3

0.5 kg of the polymer precipitate from example 2 and 0.11 kg of the lithium salt TFSI are poured into 0.7 liters of toluene, and 2.8 liters of acetonitrile are added. After 4–5 days of stirring under the same conditions as in example 2, a solution is obtained which is highly uniform. A film of electrolyte formed with this solution is not sticky at the surface after 15 minutes of drying at 60° C. The results are even better in the presence of a small amount of heptane (0.2 liters).

EXAMPLE 4

To carry out a transfer of solvent on the polymer synthesis solution in toluene of example 1 (concentration of 0.12 g/ml and Mw~235,000), with the aim of obtaining an acetonitrile content in the solvent mixture of the lower phase of 80%, the concentration to be obtained in the lower phase (0.128 g/ml) is first determined by means of FIG. 1, and the quantities of acetonitrile and heptane to be added are determined by means of Table I.

To 30 liters of toluene solution, 27 liters of acetonitrile and 81 liters of heptane therefore are added while stirring, the mixture is allowed to rest one hour and the lower phase is collected. Decanting is continued for two days to finish the separation of the upper phase still in emulsion in the lower phase (about 6 liters) and, finally, 25 liters of transferred solution are collected, where the polymer concentration is determined as being 0.128 g/ml and the acetonitrile/toluene/heptane composition 79/13/8, in percent.

TABLE I

| Polymer concentration Co (g/ml) in the toluene synthesis solution | Volume Vo (ml) of | Volume of toluene Vt (ml) in the solution | Volume of heptane added Vh (ml) | Volume of acetonitrile added Va (ml) |
| --- | --- | --- | --- | --- |
| 0.12 | 111 | 100 | 100 | 175 |
| 0.12 | 111 | 100 | 200 | 110 |
| 0.12 | 111 | 100 | 300 | 74 |
| 0.12 | 111 | 100 | 350 | 54 |
| 0.12 | 111 | 100 | 100 | 250 |
| 0.12 | 111 | 100 | 200 | 175 |
| 0.12 | 111 | 100 | 300 | 100 |
| 0.12 | 111 | 100 | 400 | 46 |
| 0.12 | 111 | 100 | 100 | 562 |
| 0.12 | 111 | 100 | 200 | 330 |
| 0.12 | 111 | 100 | 300 | 207 |
| 0.12 | 111 | 100 | 400 | 75 |

| Total volume of solvent (ml) | Polymer concentration $C_B$ (g/ml) | Acetonitrile % | Toluene % | Heptane % |
| --- | --- | --- | --- | --- |
| | | in the lower phase | | |
| 212 | 0.059 | 70 | 27 | 3 |
| 110 | 0.110 | 70 | 21 | 9 |
| 66 | 0.172 | 70 | 18 | 12 |
| 42 | 0.253 | 70 | 18 | 12 |
| 287 | 0.045 | 80 | 19 | 2 |
| 175 | 0.072 | 81 | 13 | 6 |
| 93 | 0.128 | 79 | 13 | 8 |
| 28 | 0.340 | 80 | 12 | 8 |
| 600 | 0.022 | 90 | 9 | 1 |
| 330 | 0.039 | 90 | 7 | 3 |
| 200 | 0.063 | 90 | 6 | 4 |
| 58 | 0.193 | 90 | 6 | 4 |

We claim:

1. Process for preparing a solution of an electrolyte containing a polymer-salt complex as well as a solvent of said complex, said salt being represented by formula $M^+X^-$ where $M^+$ is a cation derived from an alkali metal or the ammonium anion and $X^-$ designates an anion of a strong acid, said polymer being derived from at least one monomer comprising at least one heteroatom which is capable of forming bonds of donor-receptor type with the cation $M^+$, from a synthesis solution consisting of a synthesis solvent and said polymer, the latter is transferred into a solvent of said complex to which said salt is added, wherein a solvent of said complex and a non solvent are added to the synthesis solution under conditions producing an upper phase which is rich in non solvent and a lower phase which is rich in solvent of said complex and contains substantially all said polymer, the upper phase is separated from the lower phase, and said salt is added to said lower phase.

2. Process for the preparation of a solution of an electrolyte according to claim 1, wherein said salt is a lithium salt.

3. Process for the preparation of a solution of an electrolyte according to claim 1, wherein the synthesis solvent is a hydrocarbon.

4. Process for the preparation of a solution of an electrolyte according to claim 3, wherein the synthesis solvent is selected from aromatic, aliphatic or cycloaliphatic hydrocarbons and ethers.

5. Process for the preparation of a solution of an electrolyte according to claim 4, wherein the synthesis solvent consists of toluene.

6. Process for the preparation of a solution of an electrolyte according to claim 1, wherein the synthesis solution contains between about 0.01 and 0.5 g of polymer per ml of synthesis solution.

7. Process for the preparation of a solution of an electrolyte according to claim 6, wherein the synthesis solution contains between about 0.11 and 0.13 g of polymer per ml of solution.

8. Process for the preparation of a solution of an electrolyte according to claim 1, wherein the synthesis solvent is selected from aromatic hydrocarbons and ethers and the non-solvent is selected from aliphatic and cycloaliphatic hydrocarbons containing 5 to 15 carbon atoms.

9. Process for the preparation of a solution of an electrolyte according to claim 8, wherein the synthesis solvent consists of toluene, and the non-solvent consists of heptane.

10. Process for the preparation of a solution of an electrolyte according to claim 1, wherein said solvent of the polymer-salt complex is a polar aprotic solvent.

11. Process for the preparation of a solution of an electrolyte according to claim 10, wherein polar aprotic solvent is selected from acetonitrile, propylene carbonate, dimethyl formamide and tetramethylene sulphone.

12. Process for the preparation of a solution of an electrolyte according to claim 11, wherein a ternary mixture is formed from a synthesis solvent consisting of an aromatic hydrocarbon, a solvent of said complex consisting of said aprotic solvent and a non-solvent of said polymer consisting of an aliphatic hydrocarbon, the aromatic hydrocarbon constituting less than 30% by weight, and the aliphatic hydrocarbon less than 5% by weight of said ternary mixture.

13. Process for the preparation of a solution of an electrolyte according to claim 12, wherein the ternary mixture includes acetonitrile, toluene and heptane.

14. Process for the preparation of a solution of an electrolyte according to claim 1, wherein the polymer-salt complex is present in the solvent of said complex at a concentration which varies between about 0.01 and 0.5 g of polymer per ml of solution.

15. Process for the preparation of a solution of an electrolyte according to claim 14, wherein said concentration of polymer is about 0.07 g/ml when the polymer has a molecular weight of about 300,000.

16. Process for the preparation of a solution of an electrolyte according to claim 14, wherein said concentration of polymer is about 0.25 g/ml when the polymer has a molecular weight of about 80,000.

* * * * *

UNITED STATES PATENT AND TRADEMARK OFFICE
CERTIFICATE OF CORRECTION

PATENT NO. : 5,380,605
DATED : January 10, 1995
INVENTOR(S) : Fernand BROCHU, et al.

It is certified that error appears in the above-indentified patent and that said Letters Patent is hereby corrected as shown below:

On the title page, Item [75], the second inventor's city is listed incorrectly. It should read:

--Montreal--

Signed and Sealed this

Eleventh Day of April, 1995

Attest:

BRUCE LEHMAN

*Attesting Officer*  *Commissioner of Patents and Trademarks*